United States Patent [19]

Kinoshita

[11] Patent Number: 4,914,848

[45] Date of Patent: Apr. 10, 1990

[54] TRAWL NET

[75] Inventor: Hiromi Kinoshita, Shimonoseki, Japan

[73] Assignee: Nichimo Co., Ltd., Tokyo, Japan

[21] Appl. No.: 258,653

[22] Filed: Oct. 17, 1988

[30] Foreign Application Priority Data

Feb. 8, 1988 [JP] Japan .................................. 63-27006

[51] Int. Cl.[4] ............................................. A01K 73/04
[52] U.S. Cl. ...................................................... 43/9.1
[58] Field of Search ................................. 43/9, 9.1–9.9

[56] References Cited

U.S. PATENT DOCUMENTS 2,729,910  1/1956  Fryklund .................................. 43/9

FOREIGN PATENT DOCUMENTS

| 388207 | 1/1924 | Fed. Rep. of Germany ............ 43/9 |
| 1804535 | 5/1970 | Fed. Rep. of Germany ............ 43/9 |
| 2040769 | 2/1972 | Fed. Rep. of Germany ............ 43/9 |
| 953928 | 5/1949 | France ....................................... 43/9 |
| 465015 | 3/1967 | Japan . |
| 851832 | 10/1960 | United Kingdom ...................... 43/9 |

Primary Examiner—M. Jordan

[57] ABSTRACT

A trawl net with buoyant-force generating member whose angle of elevation in the vertical direction can be adjusted while the trawl net is being dragged or towed and by varying the angle of elevation, the trawl net can be raised or lowered to a desired depth with a high degree of response.

9 Claims, 3 Drawing Sheets

TRAWL NET

FIELD OF THE INVENTION

The present invention relates to a trawl net used in trawl fishing.

BACKGROUND OF THE INVENTION

Recently trawl fishing has almost changed from the bottom water trawl fishing to the mid-water trawl fishing.

In the case of the mid-water trawl fishing, it is relatively simple to drag or tow a trawl net while completely maintaining it in spaced apart relationship with respect to the bottom of the sea, but it is extremely difficult to drag or tow the trawl net along the bottom of the sea when the ocean floor has ridges or projections and valleys or recesses.

Especially when it is discovered that a ridge or projection exists at the bottom of the sea in the forward direction in which the towlines are dragged or towed, the speed of a trawler is increased or the towlines or warps are wound by the winches, thereby causing the trawl net to raise away from the ridge or projection.

However, when the trawl net is raised away from the ridge or projection by increasing the speed of the trawler, all the fishing gear; that is, the trawl net and otter boards must be raised to float, but in this case, because of a high degree of inertia of the fishing gear, there arises the problem that it takes a long period of time to raise the fishing gear and, consequently, the response speed or time is not satisfactory.

In the case of winding the towlines or warps by the winches, the load acting on the main engine of the trawler is increased so that the speed of the trawler changes and consequently the depth of the trawl net varies. It follows therefore that the variation in depth of the trawl net must be taken into consideration when the length of the towlines or warps are being decided, otherwise is extremely difficult to raise the trawl net to a suitable depth.

In order to solve the above and other problems, Japanese Patent Publication No. 5015/1971 discloses a method, but according to this method, since the volume of each float is predetermined, the trawl net cannot be raised to a suitable depth. In addition, a large number of floats are needed to float the trawl net so that the above-described method has not been satisfactorily used yet in practice.

BRIEF SUMMARY OF THE INVENTION

The present invention was made to substantially solve the above and other problems encountered in the conventional trawl nets and has for its object to provide a trawl net which is simple in construction and adjustment and inexpensive to manufacture such a trawl net would be capable of being raised and lowered quickly when the trawl net is being dragged or towed.

To this and other ends, according to the present invention, a buoyant-force generating member whose angle of elevation in the vertical direction can be freely adjustable even when a trawl net is being dragged or towed and is attached to the trawl net.

According to the present invention, therefore, the trawl net can be raised or lowered to a desired depth with a high degree of response by varying the angle of elevation in the vertical direction of the whole buoyant-force generation member while the trawl net is being dragged or towed.

The present invention is designed and constructed in the manner described above, even if the buoyant-force generating member is simple in construction, the floating force of the trawling net can be varied in a wide range and while the trawl net is being dragged or towed, it can be raised or lowered positively at a high degree of response. As a result, the trawl net can be handled suitably depending upon a purpose of fishing and the adjustment operation can be carried out in a simple manner. In addition, the capital cost of a trawl net becomes inexpensive, among other features.

DETAILED DESCRIPTION OF THE PREFERRED EMBODIMENTS

Figure 1:
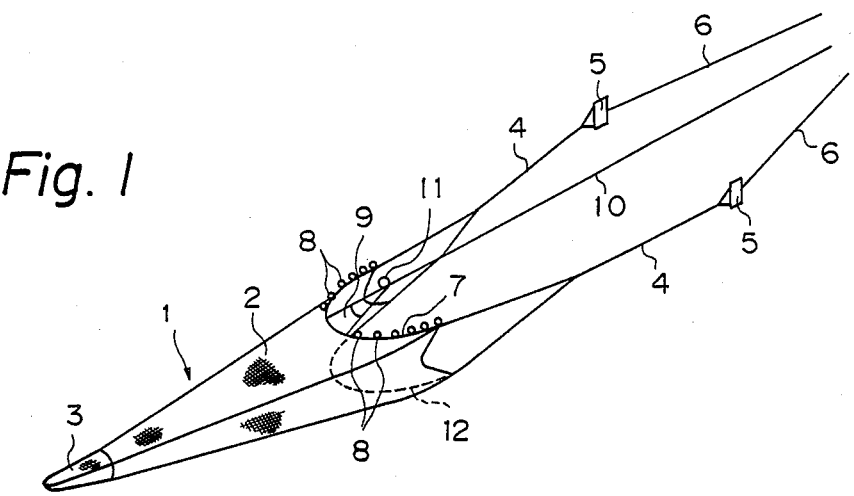
FIG. 1 is a perspective view of a preferred embodiment of a trawl net in accordance with the present invention.

Referring now to FIGS. 1-8, a preferred embodiments of the present invention will be described in detail hereinafter.

Reference numeral 1 in all of the drawings designates a trawl net main body so designed and fabricated as to be adapted for the mid-water trawling and consists of a body or bunt net 2 and a cod end net 3. The leading ends of both the sleeve portions of the trawl net main body 1 are connected through connecting ropes 4 to otter boards 5 which in turn are dragged or towed through warps 6 connected to the otter boards 5 by a trawler (not shown). A head rope 7 attached to the upper side of the opening of the bunt net 2 is attached with a plurality of floats.

In FIGS. 1-4 sheet- or film-like buoyant-force generating member 9 which is substantially in the form of a square and is made of a sheet of canvas has its base side securely attached to the mid-portion of the head rope 7. The bifurcated portion of an adjustment rope 10 extended from the trawler is securely attached to the leading end portion of the buoyant-force generating member 9. A float 11 is securely attached to the base portion of the bifurcated portion of the adjusting rope 10 in FIGS. 1-3. The angle of elevation in the vertical direction of the buoyant-force generating member 9 can be adjusted by adjusting the length of the adjusting rope 10 extended from the trawler.

Figure 2:
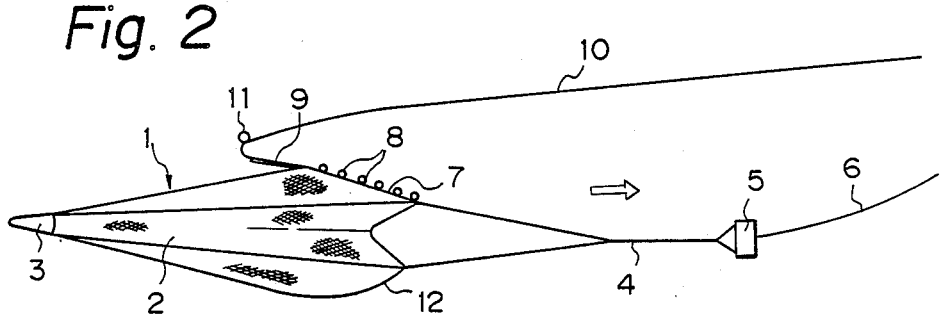
FIG. 2 is a side view thereof when the buoyant force produced by a buoyant-force generating member is zero.
Figure 3:
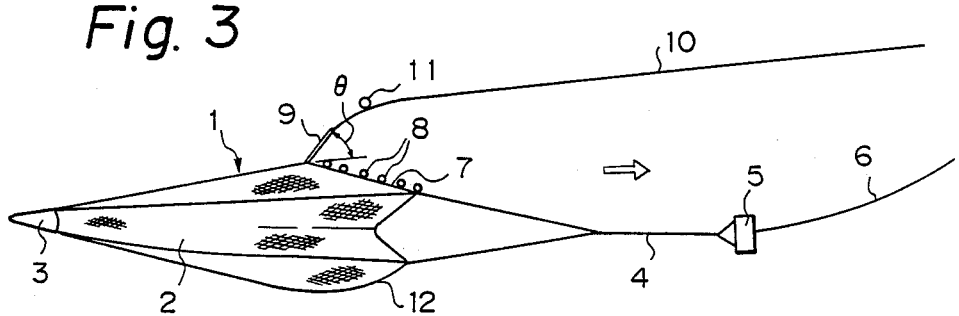
FIG. 3 is also a side view thereof, but the buoyant-force generating member is so inclined as to have an angle of elevation in the direction in which a trawl net is dragged or towed.
Figure 4:
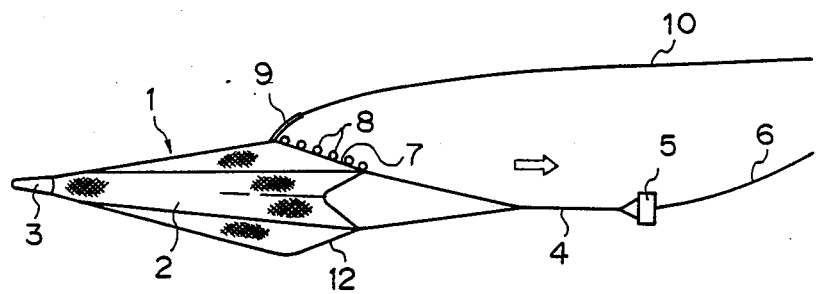
FIG. 4 is a side elevational view of another embodiment of the invention.

Referring particularly to FIGS. 2-4, the mode of operation of the preferred embodiment of the present invention with the above-described construction will be described.

In the case of the normal trawling, the adjusting rope 10 is extended sufficiently long in length from the trawler so that the buoyant-force generating member 9 is caused to be directed in the direction opposite to the trawl-net-dragging direction indicated by an arrow as shown in FIG. 2 so that the trawl net main body 1 is dragged or towed while the lift produced by the buoyant-force generating member 9 is maintained zero.

When a ridge or projection extended upwardly from the bottom of the sea is discovered in the direction in which the trawl net is dragged or towed, the adjusting rope 10 is wound up to the trawler so that the adjusting rope 10 becomes shorter in length as best shown in FIGS. 3 and 4. Then the buoyant-force generating member 9 is maintained in an inclined position with a suitable angle of elevation against the water stream in the direction in which the trawl net is dragged or towed. As a result, depending upon the velocity of the water stream striking against the buoyant-force generating member 9 and the area and angle of elevation $\theta$ of the buoyant-force generating member 9, the buoyant-force generating member 9 produces the lift so that the whole trawl net main body 1 is forced to lift at a high degree of response. In one preferred embodiment of the present invention shown in FIG. 3, the float 11 attached to the bifurcated portion of the adjusting rope 10 prevents the buoyant-force generating member 9 from being inclined downwardly of the head rope 7 by the buoyant force of the float 11.

When the specific weight of the buoyant-force generating member 9 is selected smaller than that of the water in which the trawl net is dragged or towed, the downward inclination of the buoyant-force generating member 9 is avoided and consequently the float 11 can be eliminated as shown in FIG. 4.

When the extended length of the adjusting rope 10 is adjusted by an operator on the trawler while the trawl net main body 1 is being dragged or towed, the angle of elevation $\theta$ in the vertical direction of the buoyant-force generating member 9 can be adjusted so that the lift produced by the buoyant-force generating member can be freely controlled. As a result, it becomes possible to raise or lower the trawl net main body 1 quickly to a desired depth.

Next, in order to facilitate the understanding of the present invention, the method in accordance with the present invention in which the lift is produced by the buoyant-force generating member 9 will be compared with the conventional method as disclosed in the above-mentioned Japanese Patent Application Publication No. 5015/1971 in which a plurality of floats are used to obtain a required degree of buoyant force. For instance, when the dragging resistance of the trawl net main body 1 is 12 t and the distance between the trawl net main body 1 and the otter board 5 is 150 m, then the lift required for raising the trawl net main body 1 by 10 meters is about 800 kgs. In order to obtain the lift of about 800 kgs, according to the present invention, the buoyant-force generating member 9 with the area of 5 $m^2$ may be used, but according to the above-mentioned conventional method, about 78 pieces of floats about 30 cm in diameter are required and the total weight of these floats becomes very heavy in excess of about 300 kgs so that the handling such floats in the atmosphere on the deck of the trawler is extremely difficult. However, according to the present invention, by using the buoyant-force generating member 9 having the area of 5 $m^2$, the depth of the trawl net main body 1 can be freely varied within the range from 0 to 10 meters.

So far it has been described that only one buoyant-force generating member 9 is attached to the mid-portion of the head rope 7, but is to be understood that a plurality of buoyant-force generating members 9 can be attached to the head rope 7.

Figure 7:
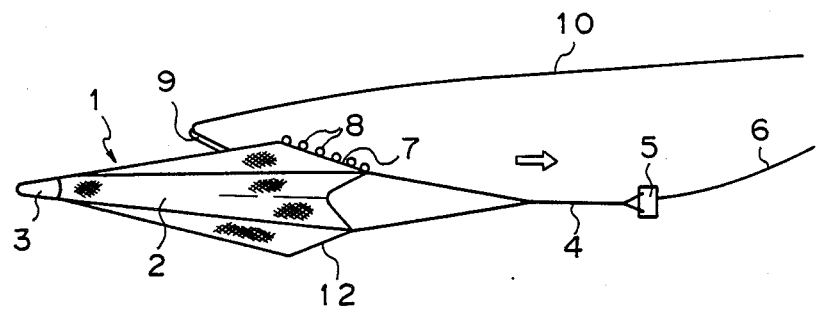
FIG. 7 is a side elevational view of still another embodiment of the invention.

Furthermore, in another preferred form of the invention, the buoyant-force generating member 9 can be attached to the upper surface portion of the bunt net 2. This is shown in FIG. 7. In this case, the downward inclination of the buoyant-force generating member 9 is prevented by the bunt-net 2 so that even when the buoyant-force generating member 9 is heavier in specific weight than the water, the float 11 can be eliminated.

Figure 5:
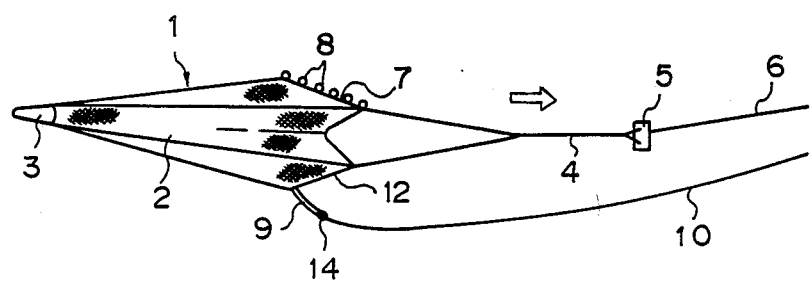
FIG. 5 is a side elevational view of still another embodiment of the invention shown in a sinking configuration.
Figure 6:
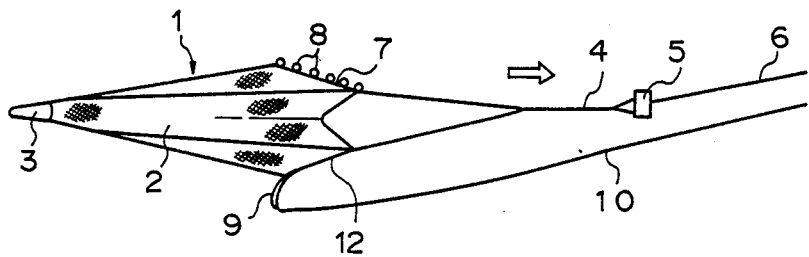
FIG. 6 is a side elevational view of the embodiment in FIG. 5, shown in a steady state configuration.
Figure 8:
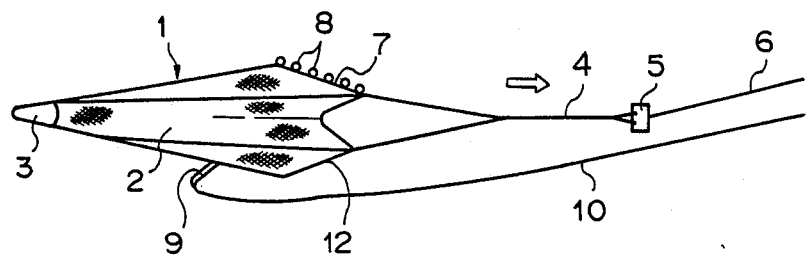
FIG. 8 is a side elevational view of yet another embodiment of the invention.

So far it has been described that the angle of elevation $\theta$ of the buoyant-force generating member 9 is decreased so that not only by the decrease of the lift but also by the weight of the trawl net main body 1 itself, the trawl net main body 1 is caused to sink. Referring to FIGS. 5, 6 and 8, it is to be understood that the buoyant-force generating member 9 may be attached to a bottom rope 12 attached to the lower side of the opening of the bunt net 2 or to the lower surface portion thereof so that the angle of elevation of the inclined buoyant-force generating generator 9 is so adjusted to produce the negative lift, thereby forcibly sinking the trawl net main body 1. Also, sinker 14 may be connected to the leading edge of buoyant-force generating member 9 where it connects to adjusting rope 10.

It is to be understood that the present invention is not limited to the above-described preferred embodiment and that various modification can be effected within the true spirit of the present invention.

What is claimed is:

1. A trawl net having a sheet or membrane shaped buoyant-force generating means whose angle of elevation in the vertical direction is adjustable while said trawl net is being dragged or towed.

2. A trawl net as set forth in claim 1, wherein the base portion of said buoyant-force generating member is attached to said trawl net while the free leading end portion is connected to an adjusting rope extended downstream of a trawler.

3. A trawl net as set forth in claim 2, wherein the base portion of said buoyant-force generating means is attached to a head rope of said trawl net and a float for giving a buoyant force to said buoyant-force generating means is located at a suitable position within the range between the leading end portion of said buoyant-force generating means and said adjusting rope.

4. A trawl net as set forth in claim 2, wherein the base portion of said buoyant-force generating means is attached to a head rope of said trawl net and said buoyant-force generating means is lighter in specific weight than the surrounding water in which said trawl net is dragged or towed.

5. A trawl net as set forth in claim 2, wherein the base portion of said buoyant-force generating means is attached to a bottom rope of said trawl net and a sinker for giving a sinking force to said buoyant-force generating means is located at a suitable position within the range between the leading end portion of said buoyant-force generating means and said adjusting rope.

6. A trawl net as set forth in claim 2, wherein the base portion of said buoyant-force generating means is attached to a bottom rope of said trawl net and said buoyant-force generating means is heavier in specific weight than the surrounding water in which said trawl net is dragged or towed.

7. A trawl net as set forth in claim 1, wherein said buoyant-force generating means is attached to the upper surface of a bunt net of said trawl net.

8. A trawl net as set forth in claim 1, wherein said buoyant-force generating means is attached to the lower surface of a bunt net of said trawl net.

9. A trawl net having a sheet or membrane shaped buoyant-force generating means whose angle of elevation in the vertical direction is adjustable by a rope connected to the leading end of said buoyant-force generating means and extending downstream of a trawler while said trawl net is being dragged or towed.

* * * * *